US010783506B2

(12) United States Patent
Dutta et al.

(10) Patent No.: US 10,783,506 B2
(45) Date of Patent: Sep. 22, 2020

(54) METHODS AND SYSTEMS FOR ACCESS CONTROL TO SECURE FACILITIES

(71) Applicant: Transparent Wireless Systems, LLC, Vienna, VA (US)

(72) Inventors: Santanu Dutta, Vienna, VA (US); Partha Chakravartti, North Potomac, MD (US)

(73) Assignee: Transparent Wireless Systems, LLC, Vienna, VA (US)

( * ) Notice: Subject to any disclaimer, the term of this patent is extended or adjusted under 35 U.S.C. 154(b) by 387 days.

(21) Appl. No.: 15/248,486

(22) Filed: Aug. 26, 2016

(65) Prior Publication Data
US 2017/0061410 A1    Mar. 2, 2017

Related U.S. Application Data

(60) Provisional application No. 62/211,263, filed on Aug. 28, 2015.

(51) Int. Cl.
*G06Q 20/14* (2012.01)
*H04W 12/08* (2009.01)
(Continued)

(52) U.S. Cl.
CPC .......... *G06Q 20/145* (2013.01); *G06Q 50/30* (2013.01); *G07C 9/00309* (2013.01);
(Continued)

(58) Field of Classification Search
CPC .. G06Q 20/145; G06Q 50/30; G07C 9/00309; G07C 2209/63; H04L 63/0861;
(Continued)

(56) References Cited

U.S. PATENT DOCUMENTS

| 5,928,309 A | 7/1999 | Korver et al. |
| 6,081,206 A | 6/2000 | Kielland |

(Continued)

FOREIGN PATENT DOCUMENTS

| JP | 2005-99018 A | * | 4/2005 | |
| WO | WO-2006094048 A2 | * | 9/2006 | ......... G06K 9/00919 |

OTHER PUBLICATIONS

Zheng, Zengwei et. al.;"Feature Learning for Fingerprint-Based Positioning in Indoor Environment"; 2015 (Year: 2015).*

(Continued)

*Primary Examiner* — Kevin H Flynn
*Assistant Examiner* — Dione N. Simpson
(74) *Attorney, Agent, or Firm* — The Marbury Law Group, PLLC

(57) ABSTRACT

A method for controlling access to a facility including: sending a first signal from a handset to a plurality of beacon modules using a low energy wireless technology, the signal comprising an identification of the handset or a user; determining received signal strength indication from each of the plurality of beacon modules and determining a time averaged received signal strength indication from each of the plurality of beacon modules. The method also includes determining the location of the handset based on the pattern of the received time-averaged signal strength indications from the plurality of beacon modules, sending a second signal from the beacon modules to an authentication server, the second signal comprising (i) the identification of the handset or a user and (ii) the time-averages received signal strength indication or individual received signal strength indication from each of the plurality of beacon modules and determining at the authentication server the nearest user or handset to an access controlled gate of the facility if a signal from more than one handset is received. The method also (Continued)

includes determining if the handset or user is authorized to enter the facility and opening a gate to allow access to the facility if the handset or user is authorized.

32 Claims, 3 Drawing Sheets

(51) Int. Cl.
| | |
|---|---|
| G07C 9/00 | (2020.01) |
| H04W 12/06 | (2009.01) |
| H04L 29/06 | (2006.01) |
| G06Q 50/30 | (2012.01) |
| H04W 12/00 | (2009.01) |
| H04W 84/12 | (2009.01) |
| H04W 4/02 | (2018.01) |

(52) U.S. Cl.
CPC ......... *H04L 63/0861* (2013.01); *H04W 4/025* (2013.01); *H04W 12/06* (2013.01); *H04W 12/08* (2013.01); *G07C 2209/63* (2013.01); *H04W 12/00503* (2019.01); *H04W 12/00512* (2019.01); *H04W 12/00514* (2019.01); *H04W 84/12* (2013.01)

(58) Field of Classification Search
CPC ..... H04W 4/025; H04W 12/06; H04W 12/08; H04W 12/00514; H04W 12/00512; H04W 84/12
USPC ........................................................ 705/13
See application file for complete search history.

(56) References Cited

U.S. PATENT DOCUMENTS

| | | | |
|---|---|---|---|
| 6,081,230 A | 6/2000 | Hoshino et al. | |
| 7,188,070 B2 | 3/2007 | Dar et al. | |
| 7,215,255 B2 | 5/2007 | Grush | |
| 7,908,149 B2 | 3/2011 | Dar et al. | |
| 8,131,596 B2 | 3/2012 | McQuilken | |
| 8,140,265 B2 | 3/2012 | Grush | |
| 8,175,886 B2 | 5/2012 | Odinak | |
| 8,847,754 B2* | 9/2014 | Buchheim | G01S 1/68 340/539.13 |
| 9,159,080 B2 | 10/2015 | Fiorucci et al. | |
| 2003/0146852 A1 | 8/2003 | O'Dell | |
| 2004/0117623 A1* | 6/2004 | Kalogridis | H04L 63/0807 713/165 |
| 2005/0286421 A1 | 12/2005 | Janacek | |
| 2007/0016362 A1 | 1/2007 | Nelson | |
| 2008/0117100 A1 | 5/2008 | Wang et al. | |
| 2008/0129545 A1* | 6/2008 | Johnson | G07B 15/063 340/933 |
| 2009/0292597 A1 | 11/2009 | Schwartz et al. | |
| 2011/0022427 A1 | 1/2011 | Dayan | |
| 2011/0153367 A1 | 6/2011 | Amigo et al. | |
| 2011/0276430 A1 | 11/2011 | Vyas et al. | |
| 2012/0130777 A1 | 5/2012 | Kaufman | |
| 2012/0265434 A1 | 10/2012 | Woodard et al. | |
| 2012/0308077 A1 | 12/2012 | Tseng | |
| 2014/0236686 A1 | 8/2014 | Grush et al. | |
| 2016/0042575 A1* | 2/2016 | Ganguly | G07B 15/02 705/13 |
| 2016/0055697 A1* | 2/2016 | Raina | G07C 9/00309 340/5.7 |
| 2016/0189324 A1* | 6/2016 | Eramian | G06Q 50/30 705/13 |
| 2016/0205238 A1* | 7/2016 | Abramson | G01C 21/3641 455/456.4 |
| 2016/0283979 A1* | 9/2016 | Chatterton | G06Q 30/0261 |

OTHER PUBLICATIONS

Letter from Deeth Williams Wall, LLP; dated Jan. 5, 2015.
http://www.verrus.com/default.asp?ctState=prHow, Wireless Parking Payment, Apr. 10, 2013, webpage, 1pg.
http://us.parkmobile.com/members/, Mobile Payment Parking Solutions, Apr. 11, 2013, webpage, 1pg.
http://sfpark.org/, Apr. 11, 2013, 3pgs.
http://www.indiegogo.com/projects/sticknfind-bluetooth-powered-ultra-small-location-stickers, Ultra small sticker with Blue Tooth low energy, Apr. 11, 2013, 18pgs.
International Standard. ISO/IEC 18000-6, "Information Technology—Radio Frequency Identification for Item Management," First Edition, Aug. 15, 2004, copyright ISO/IEC 2004, 144pgs.

\* cited by examiner

METHODS AND SYSTEMS FOR ACCESS CONTROL TO SECURE FACILITIES

This application claims the benefit of U.S. Provisional Application No. 62/211,263, filed Aug. 28, 2015, the contents of which are hereby incorporated by reference in its entirety. U.S. patent application Ser. No. 14/483,218, filed on Sep. 11, 2014 is also incorporated herein by reference in its entirety.

FIELD

The present invention is directed to methods and systems for controlling access to a facility.

BACKGROUND

In U.S. patent application Ser. No. 14/483,218, methods and systems are described for smartphone based payment in gated garages. One of the methods, called ID Card Substitution, involves using a smartphone to authenticate a user to a gated garage and, based on such authentication, causing a Garage Server to open an entrance or exit gate. In this transaction, the access control method may be separated from the payment part and applied, in a general way, to many access control applications, such as access to secure facilities, regardless of whether payment is involved for the use of the facility.

In the embodiments disclosed herein, the access control method of U.S. patent application Ser. No. 14/483,218 is complemented by a variation which does not required a cellular data link from the smartphone to a server.

SUMMARY

An embodiment is drawn to a method for controlling access to a facility including sending a first signal from a handset to a plurality of beacon modules using a low energy wireless technology, the signal comprising an identification of the handset or a user, determining received signal strength indication from each of the plurality of beacon modules and determining an average received signal strength indication from each of the plurality of beacon modules. The method also includes determining the location of the handset based on the average received signal strength indications, sending a second signal from the beacon modules to an authentication server, the second signal comprising (i) the identification of the handset or a user and (ii) the average received signal strength indication or individual received signal strength indication from the plurality of beacon modules and determining at the authentication server the nearest user or handset to an entrance of the facility if a signal from more than one handset is received. The method also includes determining if the handset or user is authorized to enter the facility and opening a gate to allow access to the facility if the handset or user is authorized.

Another embodiment is drawn to a system for controlling access to a facility including a plurality of beacon modules using a low energy wireless technology and an authentication server. The plurality of beacon modules are configured receive an identification of a handset or user and determine the location of the handset based on received signal strength indication.

DETAILED DESCRIPTION OF THE INVENTION

Cellular coverage may be inadequate or absent in some locations, such as at a garage gate when a garage entrance is below ground level or cellular coverage is poor in the general area. Although the garage may have a wi-fi local area network (LAN), it may be undesirable to require users to have to login to the wi-fi network to gain access. The methods described herein may be applied to all payment methods described in U.S. patent application Ser. No. 14/483,218, including both ID Token Affine Pament sytem and Paper Ticket Affine system.

In an embodiment, the secure facility to which controlled access/egress is being provided is a parking garage. The methods apply equally to other secure facilities.

Figure 1:
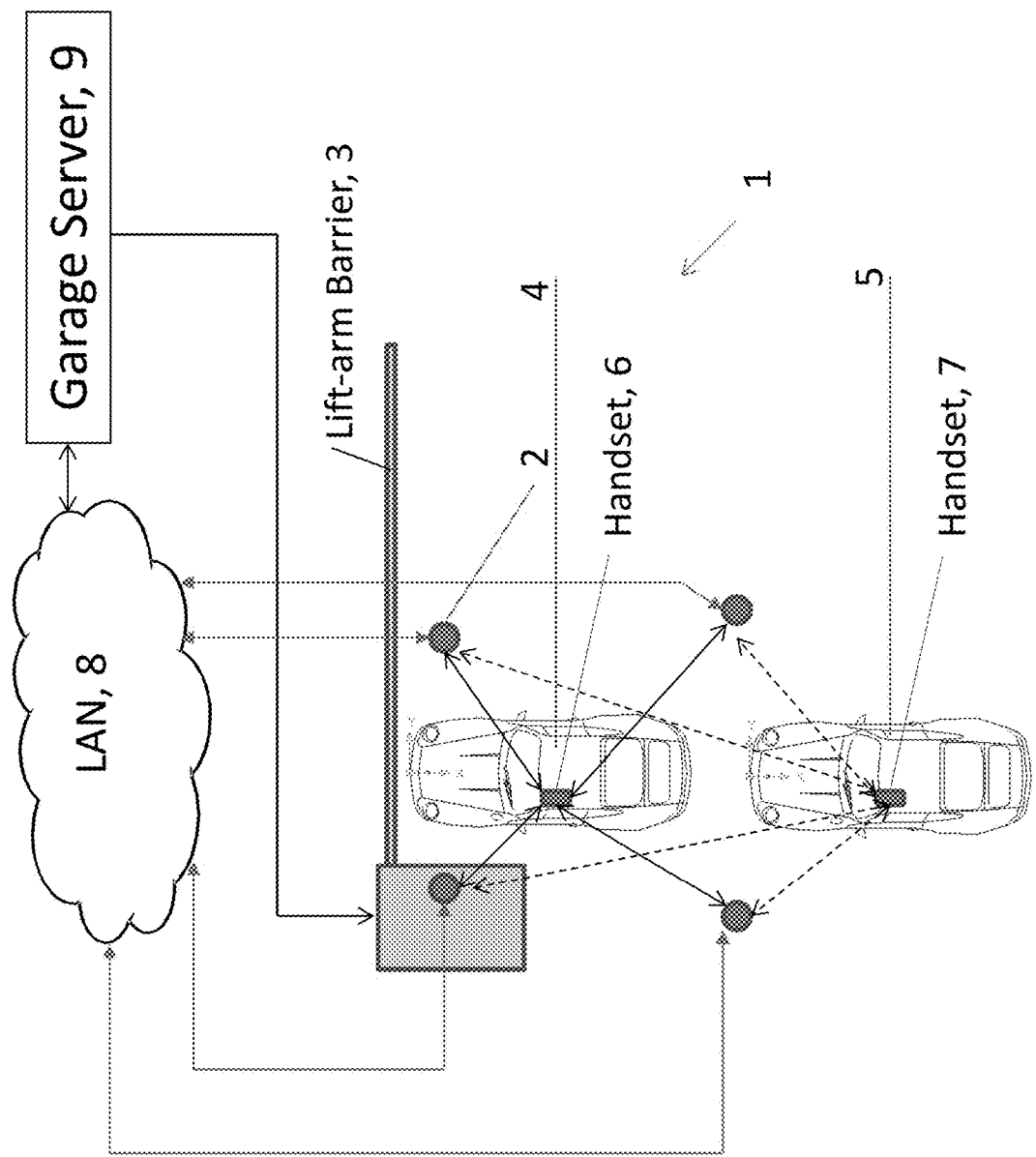
FIG. 1 is a schematic illustration of a system according to an embodiment.

FIG. 1 illustrates a system according to an embodiment. A number of beacon modules 2, also referred to as Beacon Access Points, are deployed in the vicinity of an access controlled gate, having a Lift-arm Barrier 3, which is controlled by a Garage Server 9. In an embodiment, the beacon modules 2 cover an area where a first car 4 will typically stop before entering gate. As illustrated, a second car 5 may be situated behind the first car 4, also waiting to enter. In an embodiment, first and second cars 4, 5 both have users with handsets, 6 and 7, equipped with applications (apps) which can communicate bidirectionally with the deployed beacon modules 2. The beacon modules 2 may utilize an existing short range wireless technology such as Bluetooth Low Energy™, which allows short, predetermined data packets, referred to as Advertisements, to be broadcast periodically and unilaterally, where "unilaterally" means "not in response to the receipt of any message". In addition to unilateral broadcast, the air interface also allows beacon modules 2 to return other data in response to queries received from another scanning beacon module 2, or a device such as a handset 6 or 7 also containing a beacon module, and supporting the same air interface, such as Bluetooth Low Energy™.

The beacon modules 2, or Bluetooth Access Points, in FIG. 1, in addition to communicating bidirectionally with handsets 6 or 7, also may have the ability to communicate bidirectionally with a Garage Server 9 via a local area network (LAN) 8. The LAN may be wired or wireless, the latter using, for example, a technology such as As discussed above, the handsets 6, 7 have the ability to act as beacons, corresponding to the air interface used in the Bluetooth Access Points 2. The handsets 6, 7 emit predetermined Advertisement data, including the identity (ID) and other information about the handset/user. This information may be sent on a plurality of frequency channels by frequency hopping in order to mitigate interference and multipath. In some embodiments, the communications between the handset 6 and the Bluetooth Access Points 2 may be encrypted to mitigate the risk of the handset/user ID being copied by eavesdropping and reused fraudulently.

The beacon modules 2 scan the known frequency channels for sightings of transmitted handset based beacon signals. The latter will be received by the beacon modules 2 with a received signal strength indication (RSSI) which depends on the transmitted power, path loss and multipath structure in the vicinity of the beacon modules 2. The multipath can cause more than 10 dB variation in the RSSI between signals received over different ones of a plurality of frequency hopped channels. RSSI variations can also be caused by Handset motion as it traverses the standing wave field created by multipath (this is known fast fading in cellular literature). There may also be unknown power variations caused by human body loss, e.g. absorption of RF energy by the human body, and attenuation by the body of the car, especially if the windows are up.

By averaging the RSSI values over approximately 1 s, comprising approximately 10 Advertisement events, a mean RSSI value may be obtained with substantially reduced multipath induced variations. Further, by using averaged RSSI values and known fingerprinting techniques (involving pattern matching the observed and expected mean RSSI values), the positions of the handsets, and therefore the vehicles, may be located with approximately 1.5 m accuracy using 4 beacon modules 2. Greater accuracy may be achieved using more modules. In an embodiment, 1.5 m accuracy is typically sufficient to distinguish the relative position of the first car from the one behind it; hence 4 modules are typically sufficient. Although any number of modules maybe used, such as 2, 3, 4, 5, 6 or more.

Figure 2:
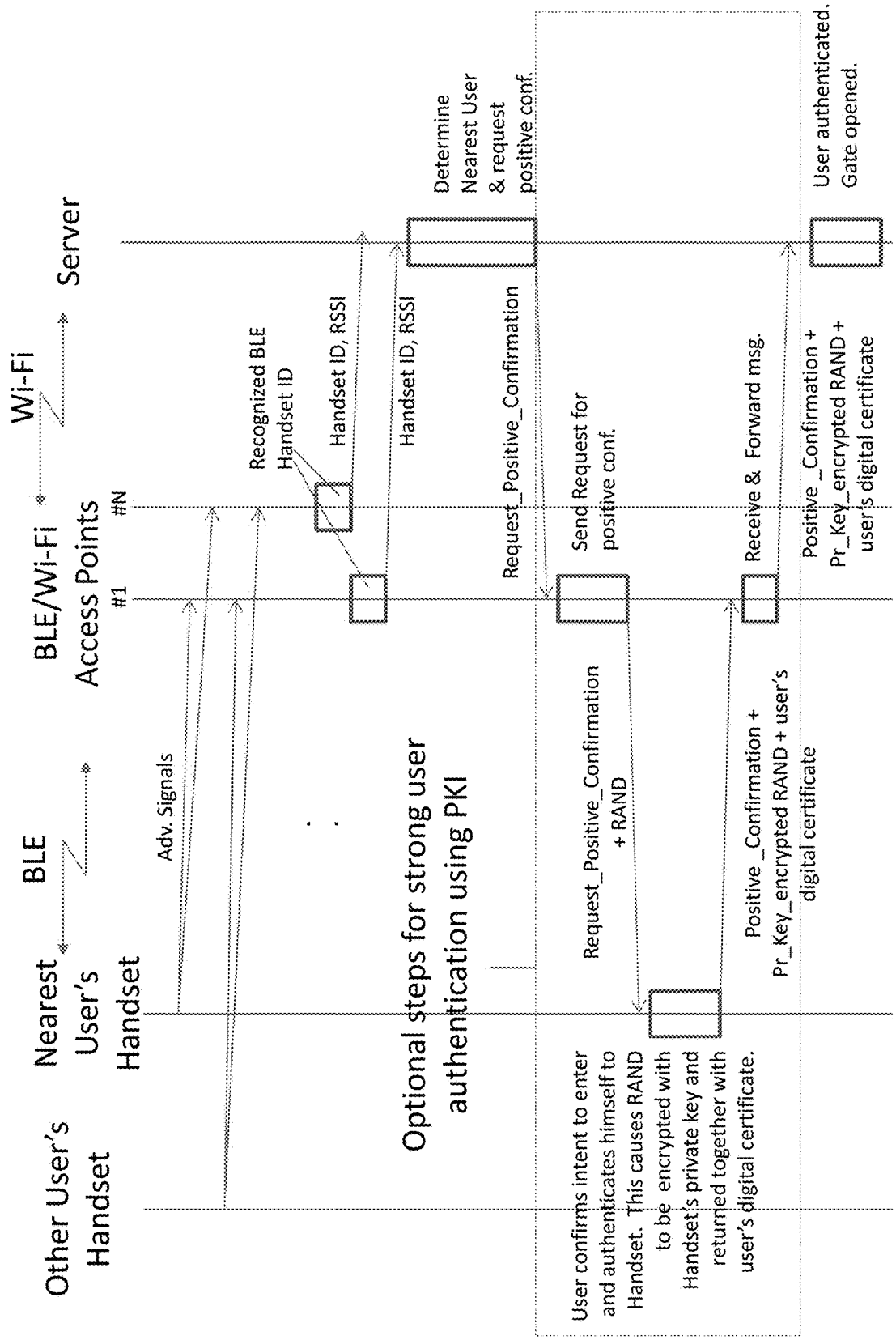
FIG. 2 is a transaction ladder diagram according to an embodiment of a system.

FIG. 2 shows a transaction ladder diagram corresponding to embodiments of the present system. As the cars 4, 5 approach the gate 3, the Advertisement signals of both handsets, 6, 7, are sighted by the beacon modules 2 mounted near the gate 3. In an embodiment, for best positioning accuracy, the beacon modules 2 preferably surround the expected location of the first car 4, as shown in FIG. 1.

Depending on the risk management requirements of the secure facility, the data in the Advertisement packet (comprising username, password and possibly other data) may be considered sufficient to identify the individual handset/user; alternatively (to save battery drain) a short packet may be sent in the Advertisement and more data (specifying the full identity of the handset/user) may be sent subsequently in response to a request from the scanning Beacon Access Point.

In some embodiments, the user ID and password in the Advertisement packet, and the location of the car at a certain expected position (i.e. close to the gate 3 as shown in FIG. 1), which is surrounded by the beacon modules 2, may be taken to be sufficient proof of the user's identity and his intent to enter. In other embodiments, a further confirmation of the user's identity, such as by strong authentication, may be necessary. Two methods involving classical strong user authentication are described below. These methods are based on Public Key Infrastructure (PKI) and Symmetric Encryption. Both of these methods may be implemented as variations of the same basic system, as described below.

Figure 3:
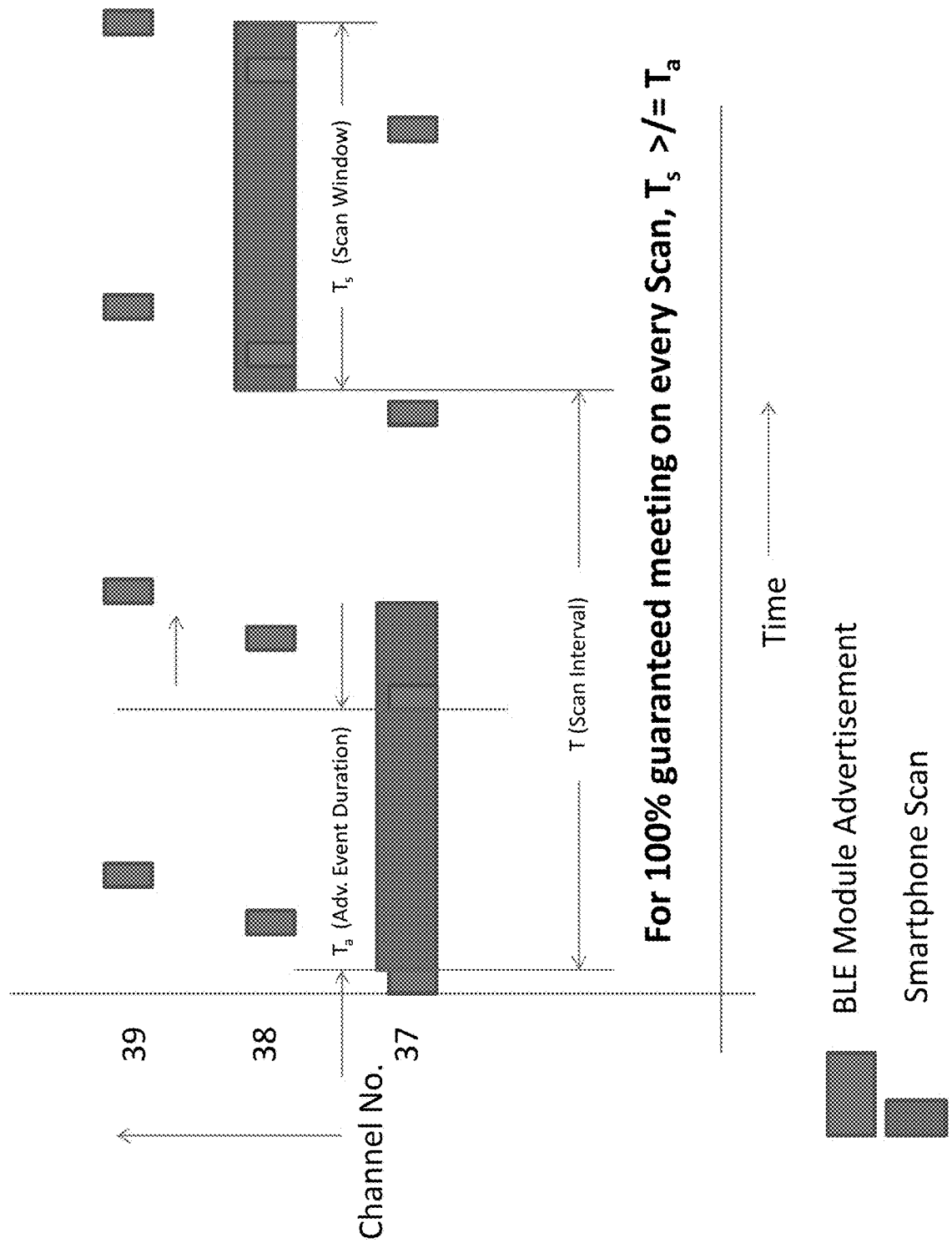
FIG. 3 is a schematic diagram illustrating a Bluetooth Low Energy™ (BLE) advertising and scanning processes.

FIG. 3 shows the BLE Advertising and Scanning processes. The Beacon Access Points 2 scan the Advertisement frequency channels. In order to save battery power, the scans may not be continuous. Typically, scanning is performed one advertising channel at a time. The duration of a scan is referred to as the Scan Window and the repetition time of the scan is referred to as Scan Interval. Sightings of the Advertisement signals occur when a Scan Window coincides in time and frequency with an Advertisement signal. This may occur at different times for different handsets 6, 7 as they transmit their Advertisements and frequency hop asynchronously. However, as long as the Scan Window is equal to or greater than the Advertisement Event Duration, it is guaranteed that a sighting will occur within every Scan Interval.

In an embodiment, as soon as a Beacon Access Point has sighted an Advertisement from a handset 6, 7, the Advertisement packet and the RSSI value are forwarded to the Garage Server. Typically, the beacon sightings will be received between 10 and 20 times per second. The RSSI value may be time averaged at the Beacon Access Point, or the individual RSSI values may be sent to the Garage Server and averaged there. In some embodiments, the communications between the handset 6, 7 and the Beacon Access Modules 2 may be encrypted to mitigate the risk of user/handset ID theft by eavesdropping.

In an embodiment, the Garage Server performs fingerprinting with time averaged RSSI values from each Beacon Access Module 2 and identifies the locations of all handsets/cars whose Advertisements have been sighted. In the present embodiment of the system, determining the relative location (i.e. determining which of the cars is the nearest to the gate) is more important than the absolute location of each car. In other words, determining the relative distances of the cars from the expected (nearest) location is more important than determining the absolute locations of the cars. This reduces the accuracy requirement relative to absolute positioning and makes the fingerprinting algorithm more robust.

In an embodiment, the handset ID, which comprises a username and password for the car nearest to the gate, is authenticated by the Garage Server for the user's subscription status (registration, payment method, etc.). In one embodiment, if the authentication is successful, the car is allowed immediate access. This provides the best user experience as it requires no action on the user's part. The user experience is similar to RFID based highway toll collection.

In another embodiment, stronger user authentication may be required than is provided by username and password. Two methods involving classical strong user authentication are described below, as applied to the present application. They are based on Public Key Infrastructure (PKI) and Symmetric Encryption. However, other strong user authentication methods may be used as desired.

Strong User Authentication by PKI

At the time of registration, the handset 6, 7 is issued a set of PKI public and private keys, as well as a digital certificate traceable to a trusted Certificate Authority (CA). As illustrated in FIG. 2, after the Garage Server has identified the nearest car by fingerprinting, a Request_Positive_Confirmation message is sent to one of the Beacon Access Points (#1 in the example of FIG. 2) for forwarding to the handset 6, 7 in the nearest car. In an embodiment, the above message is accompanied with a random string, RAND.

Beacon Access Point #1 forwards this message and RAND to the handset 6 in the nearest car. Upon receipt of the [Request_Positive_Confirmation+RAND] message from the Beacon Access Point, the handset 6 requests the user to provide an input indicating his intent to enter and also authenticate himself to the handset 6. The user input may be a secret Personal Identification Number (PIN) or a biometric input, such as a voice response or a fingerprint scan. For example, the handset 6 may issue a voice prompt, such as "do you wish to enter" to which the user would say "yes" or "no". A "no" response would terminate the current session for the particular user.

Upon successful user authentication, the handset 6 creates a digital signature by encrypting RAND with the user's PKI private key. In an embodiment, a payload is created which includes the following fields: Postive_Confirmation message, the user's private key encrypted RAND and the user's digital certificate, which contains the user's public key digitally signed by the CA ("digitally signed by the CA" means that the user's public key is encrypted by the CA's private key). This payload is sent by the handset 6 to the Beacon Access Point which requested the positive confirmation.

Strong User Authentication by Symmetric Encryption

As an alternative to PKI, a somewhat simpler authentication method could be used. For example, an authentication method involving symmetric authentication, such as data encryption standard (DES), e.g. U.S. FIPS PUB 46-2 and/or ANSI X3.92. Here, the server and the Handset 6 both have identical (or symmetric) encryption keys which are personalized to the particular user. The keys may be synchronously and randomly time varying to prevent them being copied and redistributed. The keys may be distributed to the user at the time of registration.

Split of processing between Garage Server and Beacon Access Points

As is apparent, the split of processing tasks between the Beacon Access Points and the Garage Server, described here as an example, could be redistributed in other embodiments without departing from the methods/systems described here.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A method for controlling entrance or egress access to a facility having an access controlled gate controlled by a server in which a plurality of handsets located at a plurality of distances from the gate are sending signals, the method comprising:
   sending a first signal from each handset to a plurality of beacon modules using a wireless technology, the signal comprising an identification of the handset or a user;
   for each of the first signals, determining at each of the plurality of beacon modules, a plurality of Advertisement packets having received signal strength indication values received from each of the plurality of handsets;
   averaging the received signal strength indication values to determine averaged values of signal strength indication, received by each of the beacon modules for each of the first signals;
   sending second signals from the beacon modules to the server, the second signal comprising (i) the identification of each handset or a user and (ii) the averaged received signal strength indication values or non averaged received signal strength indication values from the plurality of beacon modules;
   determining at the server, the nearest user or handset relative to an expected location based on the averaged received signal strength indication values or non averaged received signal strength indication values;
   determining, based on authenticating the nearest handset or user, if the nearest handset or user is authorized to enter the facility; and
   opening a gate to allow access to the facility if the nearest handset or user is authorized,
   wherein a location of the nearest handset or user is determined relative to the locations of other handsets or users, and a determination is made that the user who is allowed access to the facility is the one that is most likely to be in the expected location.

2. The method of claim 1, wherein the facility is a parking garage.

3. The method of claim 1, wherein first signal further comprises a password.

4. The method of claim 3, wherein all signals involving the handset comprises exclusively short range wireless technologies with no use of long range wireless technologies.

5. The method of claim 4, wherein the short range technologies comprise Bluetooth.

6. The method of claim 1, wherein the plurality of beacon modules surround a location where the user is expected to be positioned.

7. The method of claim 6, wherein an actual location of the user is within 0-5 feet a gate.

8. The method of claim 1, wherein the expected location is within 0-5 feet of an access gate.

9. The method of claim 8, wherein the expected location is within 1-3 feet of an access gate.

10. The method of claim 1, further comprising using strong authentication of the user, wherein strong authentication comprises:
    authenticating the user to the handset; and
    responsive to successful authentication of the user performed in the handset, the handset executing digital signatures using the user's private key stored in the handset.

11. The method of claim 10, wherein authenticating the user to the handset comprises using a biometric signature comprising voice, fingerprint or a combination thereof.

12. The method of claim 11, further comprising:
    sending a request_positive_confirmation message together with a token comprising a random data string from the sever to a beacon module;
    forwarding the request_positive_confirmation message and the token from the beacon module to the handset;
    confirming to the handset an intention to enter the facility;
    responsive to confirming the intention to enter the facility, the handset encrypting the token with a private key and returning to the beacon module the encrypted token and a digital certificate that contains a public key corresponding to the private key used to encrypt the token;
    forwarding the encrypted token and the digital certificate from the beacon module to the server;
    checking the validity of the public key contained in the received digital certificate with the server and, responsive to confirmation of validity, decrypting the token data with the said public key, and subject to the decrypted token matching the sent token, declaring the user as authenticated and opening the gate.

13. The method of claim 11, wherein the authentication transaction involves the steps of:
    the server sending a request_positive_confirmation message together with a token comprising a random data string to a beacon module,
    the beacon module forwarding the request_positive_confirmation message and the token to the handset,
    the user confirming to the handset his intention to enter,
    responsive to the user indicating his intention to enter, the handset encrypting the token with a secret symmetric key and returning to the beacon module the encrypted token,
    forwarding the encrypted token from the beacon module to the server; and
    decrypting on the server, token data with the same symmetric key used by the handset, and opening the gate when the decrypted token matches the sent token.

14. The method of claim 10, where strong authentication comprises public key infrastructure.

15. The method of claim 10, wherein strong authentication comprises symmetric encryption.

16. The method of claim 1, wherein the method of controlling access is used for both entrance and egress of the garage.

17. The method of claim 1, wherein the second signals comprises Wi-Fi.

18. The method of claim 1, wherein the location of the handset or user determined relative to other handsets or users comprises comparing patterns of received signal strength indication values as received by the plurality of beacons from each handset located in a coverage range of the beacons.

19. The method of claim 18, wherein the handset determined to be in the expected location is the handset whose pattern of received signal strength indication values most closely matches an expected pattern for the expected location.

20. The method of claim 1, wherein the server performs time averaging of the non-time averaged received signal strength indication values.

21. A system for controlling access to a facility comprising:
a plurality of beacon modules using a wireless technology, wherein each beacon module has a beacon module identification; and
a server performing handset or user authentication,
wherein the plurality of beacon modules are configured to:
receive an identification signal from each of a plurality of radio transmitters, each radio transmitter being associated with a user;
measure a radio signal attribute which depends on the distance of the radio transmitter from the beacon module receiver;
determine a relative location of each radio transmitter, based on the radio signal attribute, with respect to an expected location compared to the relative locations of other radio transmitters with respect to the expected location; and
determine that the user who is allowed access to the facility is the one that is most likely to be in the expected location.

22. The system of claim 21, wherein the relative location of the handset is determined from average values of the received signal strength indications corresponding to the handset as received by the plurality of beacon modules.

23. The system of claim 21, wherein the plurality of beacon modules are configured to surround the handset.

24. The system of claim 21, wherein the facility is a parking garage.

25. The system of claim 21, wherein the system is configured to use strong authentication.

26. The system of claim 21, wherein the strong authentication comprises public key infrastructure.

27. The system of claim 21, wherein strong authentication comprises symmetric encryption.

28. The system of claim 21, wherein the beacon modules are configured to determine the location of the handset within 0-5 feet of a gate.

29. The system of claim 28, wherein the beacon modules are configured to determine the location of the handset within 1-3 feet of a gate.

30. The system of claim 21, further comprising a biometric sensor.

31. The system of claim 21, where the determination of the relative location is made by analyzing distributions of the measured radio signal attribute over the beacon module identifications.

32. The system of claim 21, where the radio signal attribute is the time-averaged received signal strength indication received by each beacon module from each radio transmitter.

* * * * *